Feb. 25, 1936. J. J. DESMOND Re. 19,864

GANG OPERATED SWITCH

Original Filed April 5, 1930 2 Sheets-Sheet 1

Inventor
John J. Desmond
By Arthur R. Wolfolk
Attorney

Feb. 25, 1936. J. J. DESMOND Re. 19,864

GANG OPERATED SWITCH

Original Filed April 5, 1930 2 Sheets-Sheet 2

Inventor

John J. Desmond

By Arthur R. Woolfolk

Attorney

Reissued Feb. 25, 1936

Re. 19,864

UNITED STATES PATENT OFFICE 19,864

GANG OPERATED SWITCH

John J. Desmond, Hubbard Woods, Ill., assignor to Line Material Company, South Milwaukee, Wis., a corporation of Delaware Original No. 1,903,095, dated March 28, 1933, Serial No. 441,797, April 5, 1930. Application for reissue November 15, 1934, Serial No. 753,241

5 Claims. (Cl. 200—48)

This invention relates to gang operated switches.

While the invention is applicable to a number of different uses, it is, nevertheless, particularly adapted for use on a high voltage transmission line, such, for example, as a three-phase power line.

Heretofore it has been the usual practice to place the three switches in line and to operate them by a steel shaft. Attempts to increase the insulation between the several switches have been made and have consisted primarily in the substitution of an insulating shaft for the steel shaft. However, due to warping, inherent springiness and other defects of this type, these attempts have not proven wholly satisfactory. For example, one of the pronounced defects from this construction lies in the fact that when the connecting shaft is made of wood, it frequently warps and thus alters or affects the opening and closing position of the respective switches.

In addition to this, the maximum insulation between the phases of the switch is not very greatly increased by this construction.

This invention is designed to overcome the defects noted above, and objects of this invention are to provide a novel form of gang operated switch which is so constructed that the maximum insulation between phases of the switch is obtained in a very simple and effective manner, in which insulating connecting rods are employed in such a manner that twisting or warping will not affect the opening and closing positions of the respective switches, and in which there is no metallic operating shaft directly connecting the several switches.

In greater detail, objects of this invention are to provide a gang operated switch, for example, for polyphase transmission lines in which the switches in the different phases may be readily arranged in a triangular manner, that is to say, with the individual switches at the apices of the triangle, and in which the main operating shaft is connected to the rock arms of the switches by wooden connectors so that twisting or warping of these connectors will not affect the relative opening and closing positions of the switches.

Further objects are to provide a novel manner of supporting the individual switches of the gang operated switch so that there is no chance of flashovers or other disturbances from excessive voltage surges, for example, those produced by lightning, and in which the individual switches have their base portions or other suitable portions carried by a wooden supporting structure.

An embodiment of the invention is shown in the accompanying drawings, in which.

Figure 1:
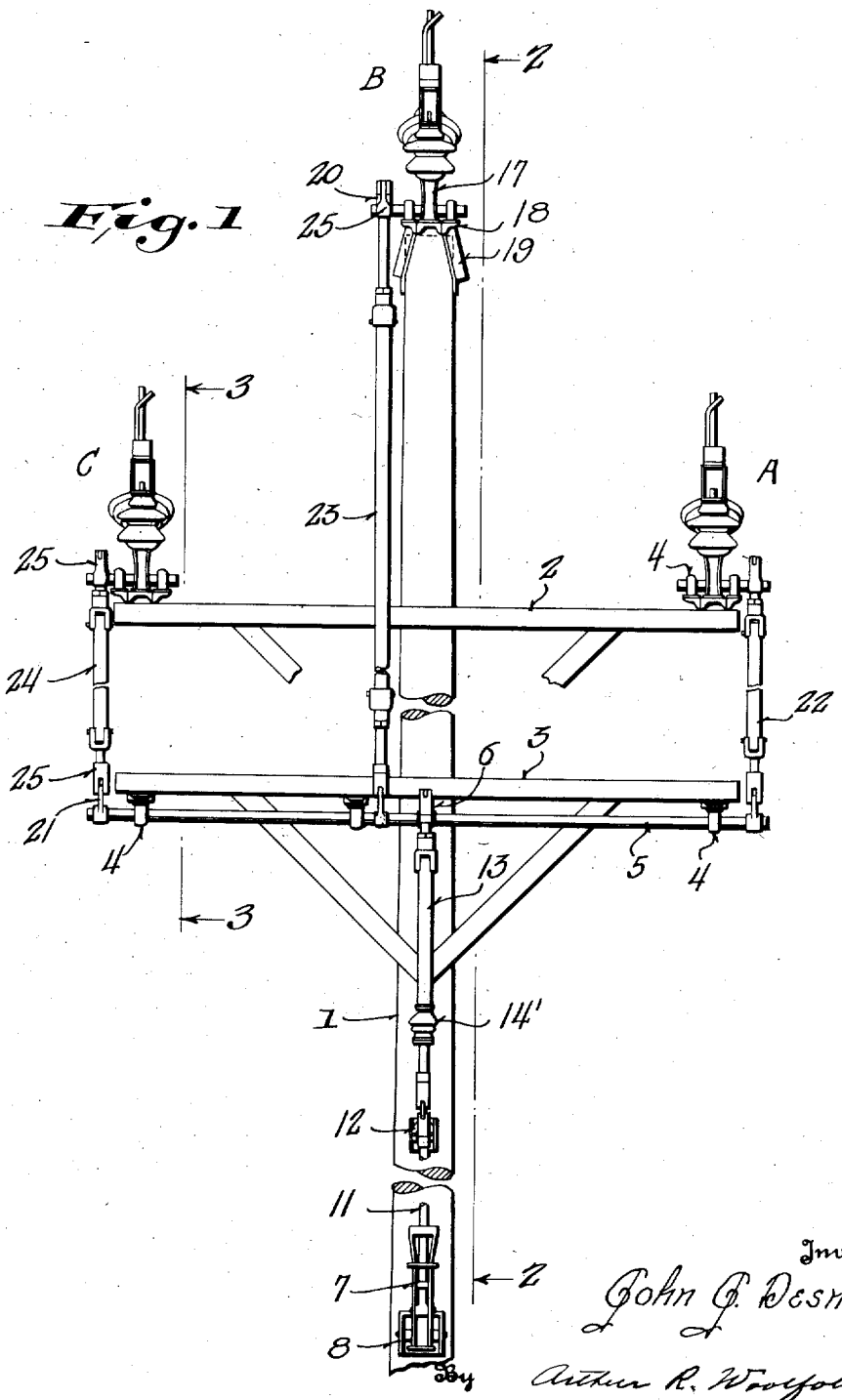
Figure 1 is a view partly broken away showing the gang operated switch.

Referring to the drawings, it will be seen that the gang operated switch has been shown as carried by one of the usual poles 1 of the transmission line. The pole is provided with an upper pair of spaced parallel wooden arms 2 and with a lower pair of spaced parallel wooden arms 3. These arms may, of course, be inset in notches cut in the pole, as shown in Figure 2 for instance, and may be suitably braced, as indicated in Figures 1 and 2.

The lower pair of arms 3 carry the bearing supports 4 for the main steel operating or rock shaft 5. This shaft is provided with a rock arm 6 which is connected to an operating lever 7 pivotally carried by a support 8 attached to the lower portion of the pole. This operating lever is provided with an operating handle 9 and is adapted to rock just past dead center in order to lock the switch in closed position, preferably when the lever is uppermost. When the lever is rocked downwardly, the switch is opened, as will hereinafter appear. This operating lever is of the usual and well known construction, and preferably comprises a pair of arms between which the inwardly bent end 10 of a connecting rod 11 is pivoted. This connecting rod 11 has its uppermost end preferably pivoted to a guide 12 which, as indicated in Figure 2, may consist of a pivoted lever. The connecting link continues, in effect, upwardly to the rock arm 6 of the main rock shaft 5, as shown in Figure 2, and an intermediate portion 13 of wood or other insulating material is provided. Also, it is preferable to provide an insulator 14' between the metal portions of the composite connecting rod and the lower end of the wooden section 13, as shown in Figures 1 and 2.

It is also to be distinctly understood that although the connecting rod, from the operating lever or handle to the crank arm or rock arm 6 of the main shaft, has been shown as pivoted intermediate its ends upon the rocking guide 12, it is to be distinctly understood that such connecting link or rod may extend continuously from the operating lever to the rock arm 6, provided there is not an excessive distance between such portions.

Figure 2:
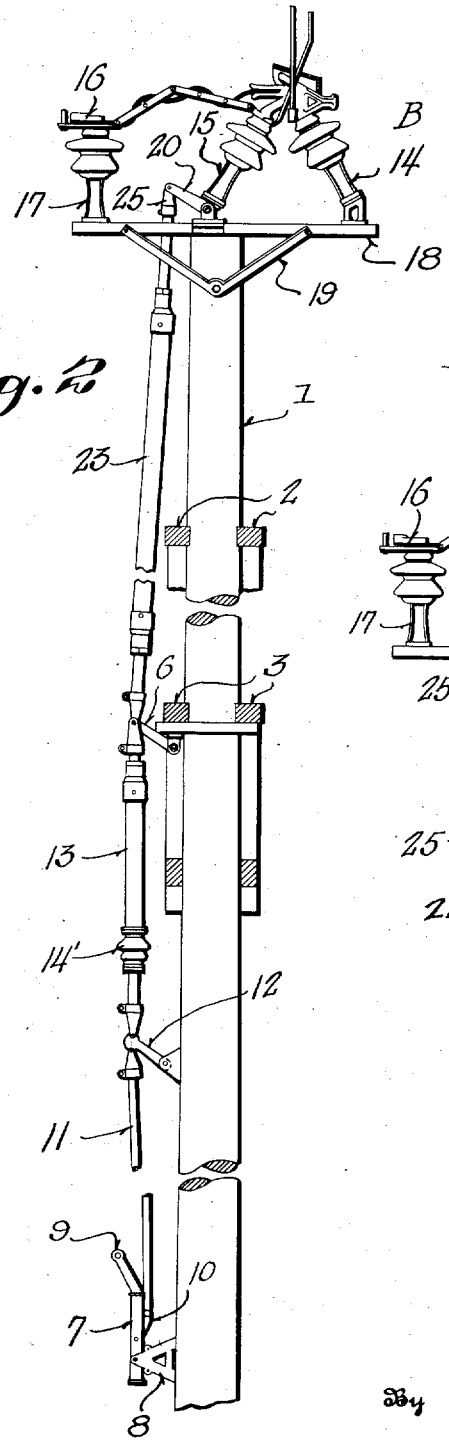
Figure 2 is a sectional view on the line 2—2 of Figure 1, with the outermost switch omitted for the sake of clearness.
Figure 3:
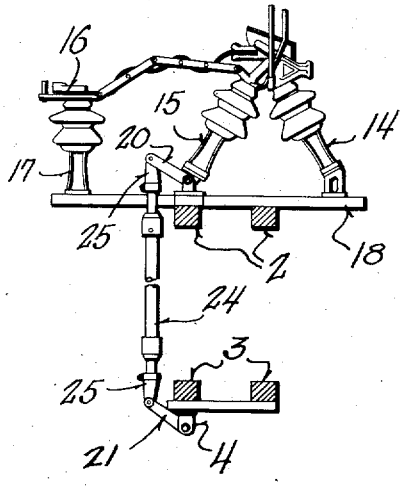
Figure 3 is a sectional view on the line 3—3 of Figure 1.

The switches for the several phases are indicated generally at A, B and C, and each comprises a stationary portion 14 and a movable or pivotally mounted portion 15, see Figures 2 and 3. These portions carry the stationary and movable blades in the usual manner, the movable portion having its blade connected by a flexible cable to a stationary terminal 16 mounted upon a suitable stationary portion 17. Each switch unit is carried by a base member 18.

The switches A and C are secured to the parallel, transverse arms 2 in widely spaced relation to each other, as shown in Figure 1. The switch B has its base 18 mounted upon the top of the pole and is provided with suitable braces, as indicated at 19 in Figure 2.

The mounting of the individual switches A, B and C will be seen to be very sturdy and reliable and to afford the utmost security of support for the switches.

Each switch is provided with a rock arm or crank arm 20 which, in each instance, is connected to a crank arm or rock arm 21 correspondingly positioned upon and secured to the main rock shaft 5. The connecting links 22, 23 and 24 for the switches A, B, and C, see Figure 1, are each provided with an intermediate wooden or other insulating portion which is secured to end clevises pivotally attached to the arms 20 and 21 respectively. Obviously these connecting rods or links may be made adjustable to lengthen or shorten them in any suitable manner, as by screwing or clamping their metal end portions within the end clevises, so that the exact adjustment desired may be most easily obtained. For example, attention is directed to Figure 3, from which it will be seen that the end clevises 25 receive the threaded ends of the metal end portions of the connecting link 24. Of course, other forms of adjustment could be readily employed.

It is apparent that the maximum spacing and wood insulation between phases of the switch is obtained by the use of these wooden or insulating connecting rods or links, and that, although these connecting rods or links may warp or twist, nevertheless they will not affect the relative opening or closing positions of the several switches. The main rock shaft or operating shaft 5 is formed of steel or other metal and will not warp. Consequently the correct, relatively angular position of the several rock arms or levers 21 will be permanently maintained, thus insuring simultaneous opening and closing of the several switches. The wooden connecting rods or links 22, 23, and 24 are not called upon to transmit torsion, but merely longitudinal forces. Consequently twisting of these rods does not affect the relative opening and closing positions of the several switches.

This construction provides a supporting structure for the metallic rock shaft which is distinct and separate from the supporting structure for the switch units. There is, therefore, the greatest possible insulation between the metallic rock shaft and the switch units which would not be obtained had the metallic rock shaft been carried by the same structure that carries the switch units.

The metallic rock shaft does not warp due to temperature changes, but in view of the fact that this is a conducting member, it obviously would decrease the total insulating effect if it were carried by the same structure that carries one or more of the switch units. However, by having the metallic rock shaft, as stated and as shown, carried by a separate supporting structure, it is clear that the maximum possible insulation is obtained.

It is to be noted also that there is no metallic intermediate portion between the several switches of the gang operated switch, and consequently the insulation between successive phases, and between any given phase and the ground, is very greatly increased by this construction.

It will be seen, further, that the construction is very simple, is easy to produce, and is relatively cheap. It lends itself readily to the practical requirements of a transmission line.

Although this invention has been described in considerable detail, it is to be understood that such description is intended as illustrative rather than limiting, as the invention may be variously embodied and is to be interpreted as claimed.

I claim:

1. A gang operated switch comprising a plurality of switch units, an insulating structure supporting said switch units in laterally and vertically spaced relation, each switch unit having a blade carried by a rock shaft distinct and separate from the rock shaft of each of the remaining switch units, and each switch unit having a rock arm carried by its rock shaft, a metallic rock shaft spaced from each switch unit and provided with a plurality of rock arms, insulating links joining said last mentioned rock arms with the rock arms of the said switch units, and means spaced from said last mentioned rock shaft for operating said rock shaft.

2. A gang operated switch comprising a plurality of switch units, an insulating structure supporting said switch units in laterally and vertically spaced relation, each switch unit having a blade carried by a rock shaft distinct and separate from the rock shaft of each of the remaining switch units, and each switch unit having a rock arm carried by its rock shaft, a metallic rock shaft spaced from each switch unit and provided with a plurality of rock arms, insulating links joining said last mentioned rock arms with the rock arms of the said switch units, a hand lever positioned below said last mentioned rock shaft, and a link mechanism connecting said last mentioned rock shaft and said hand lever, said link mechanism including an insulating link portion.

3. A gang operated switch comprising a plurality of switch units, an insulating supporting structure supporting said switch units in spaced relation, each switch unit having a blade carried by and insulated from a rock shaft distinct and separate from the rock shaft of each of the remaining switch units, each switch unit having a rock arm carried by its rock shaft, a second supporting structure spaced from said first mentioned supporting structure, a metallic rock shaft spaced from each switch unit and carried by said second supporting structure and provided with a plurality of rock arms, insulating links joining said last mentioned rock arms with the rock arms of said switch units, and means spaced from said last mentioned rock shaft for operating said rock shaft.

4. A gang operated switch comprising a plurality of switch units, an insulating supporting structure supporting said switch units in spaced relation, each switch unit having a blade carried by and insulated from a rock shaft distinct and separate from the rock shaft of each of the remaining switch units, each switch unit having a rock arm carried by its rock shaft, a second supporting structure spaced from said first mentioned supporting structure, a metallic rock shaft spaced from each switch unit and carried by said second supporting structure and provided with a plurality of rock arms, insulating links joining said last mentioned rock arms with the rock arms of said switch units, a hand operated member positioned below said last mentioned rock shaft, and link mechanism including an insulating link portion operatively connecting said rock shaft and said hand operated member.

5. A gang operated switch comprising a plurality of switch units, an insulating supporting structure supporting said switch units in spaced relation, each switch unit having a blade carried by and insulated from a rock shaft distinct and separate from the rock shaft of each of the remaining switch units, each switch unit having a rock arm carried by its rock shaft, a second supporting structure spaced from said first mentioned supporting structure, a metallic rock shaft spaced from each switch unit and carried by said second supporting structure and provided with a plurality of rock arms, insulating links joining said last mentioned rock arms with the rock arms of said switch units, each of said insulating links being adjustable to permit accurate alignment of said switch units, and means spaced from said last mentioned rock shaft for operating said rock shaft.

JOHN J. DESMOND.